(12) United States Patent
Wiggins et al.

(10) Patent No.: US 7,284,658 B2
(45) Date of Patent: Oct. 23, 2007

(54) ROLLER SAFETY SUPPORT SYSTEM FOR CONVEYOR SYSTEM

(75) Inventors: Daniel G. Wiggins, Marquette, MI (US); Robert J. Airaudi, Isheming, MI (US); Robert L. Welker, III, Marquette, MI (US); James L. Flinn, Gwinn, MI (US)

(73) Assignee: Argonics, Inc., Marquette, MI (US)

( * ) Notice: Subject to any disclaimer, the term of this patent is extended or adjusted under 35 U.S.C. 154(b) by 259 days.

(21) Appl. No.: 11/043,754

(22) Filed: Jan. 26, 2005

(65) Prior Publication Data

US 2006/0163041 A1    Jul. 27, 2006

(51) Int. Cl.
  *B65G 21/00* (2006.01)
  *B65G 45/14* (2006.01)
(52) U.S. Cl. .................... 198/860.3; 198/497
(58) Field of Classification Search ............ 198/860.3, 198/861.1, 842, 497
  See application file for complete search history.

(56) References Cited

U.S. PATENT DOCUMENTS

| | | |
|---|---|---|
| 789,628 A | 5/1905 | Rhodes |
| 897,955 A | 9/1908 | Barrett et al. |
| 1,275,808 A | 8/1918 | Wentz |
| 1,580,638 A | 4/1926 | Benbow |
| 1,710,224 A | 4/1929 | Keltie |
| 1,779,686 A | 10/1930 | Alver |
| 2,417,477 A | 3/1947 | Finney, Jr. |
| 2,498,976 A | 2/1950 | Williams |
| 2,541,220 A | 2/1951 | Du Perret |
| 3,035,683 A | 5/1962 | Bishop |
| 3,319,779 A | 5/1967 | Hermann |
| 3,610,406 A | 10/1971 | Fleischauer |
| 3,665,846 A | 5/1972 | Schlunke |
| 3,743,078 A | 7/1973 | Pittoreau |

(Continued)

FOREIGN PATENT DOCUMENTS

DE    39 40 786    5/1991

(Continued)

OTHER PUBLICATIONS

PPI Heavy Duty Return Roll Guard Installation & Operating Instructions and brochure page.

*Primary Examiner*—Mark A. Deuble
(74) *Attorney, Agent, or Firm*—Wood, Phillips, Katz, Clark & Mortimer

(57) ABSTRACT

A conveyor system having a conveying belt trained around a plurality of guide rollers for movement in an endless travel path to convey articles and materials in a travel line. A first roller is mounted in an operative position on a support to bear against the conveying belt. A roller safety support system has a wall assembly that confines downward movement of the first roller in the event that the first roller becomes disengaged from the operative position. The roller safety support system further includes a frame assembly. The wall assembly is mounted to the frame assembly so that an upwardly facing surface on the wall assembly bears supportingly against the first roller in the event that the first roller becomes disengaged from the operative position. The upwardly facing surface bounds a receptacle in which the first roller is confined by the wall assembly in the event that the first roller disengages from the operative position. The receptacle has a variable configuration.

33 Claims, 11 Drawing Sheets

U.S. PATENT DOCUMENTS

| | | |
|---|---|---|
| 3,848,542 A | 11/1974 | Schied et al. |
| 3,944,050 A | 3/1976 | Kane |
| 5,078,250 A | 1/1992 | Cole |
| 5,226,703 A | 7/1993 | Norman |
| 5,341,920 A | 8/1994 | Riffe |
| 5,341,921 A | 8/1994 | Kokolis |
| 5,355,992 A | 10/1994 | Baig et al. |
| 5,429,225 A | 7/1995 | Schiesser et al. |
| 5,725,292 A | 3/1998 | Keedy et al. |
| 6,318,545 B1 | 11/2001 | Ross, II |
| 6,913,138 B2 * | 7/2005 | Wiggins .................... 198/841 |
| 7,014,035 B2 * | 3/2006 | Wiggins .................... 198/497 |

FOREIGN PATENT DOCUMENTS

| | | |
|---|---|---|
| FR | 2782989 | 3/2000 |
| FR | 2782990 | 3/2000 |
| FR | 2782991 | 3/2000 |

* cited by examiner

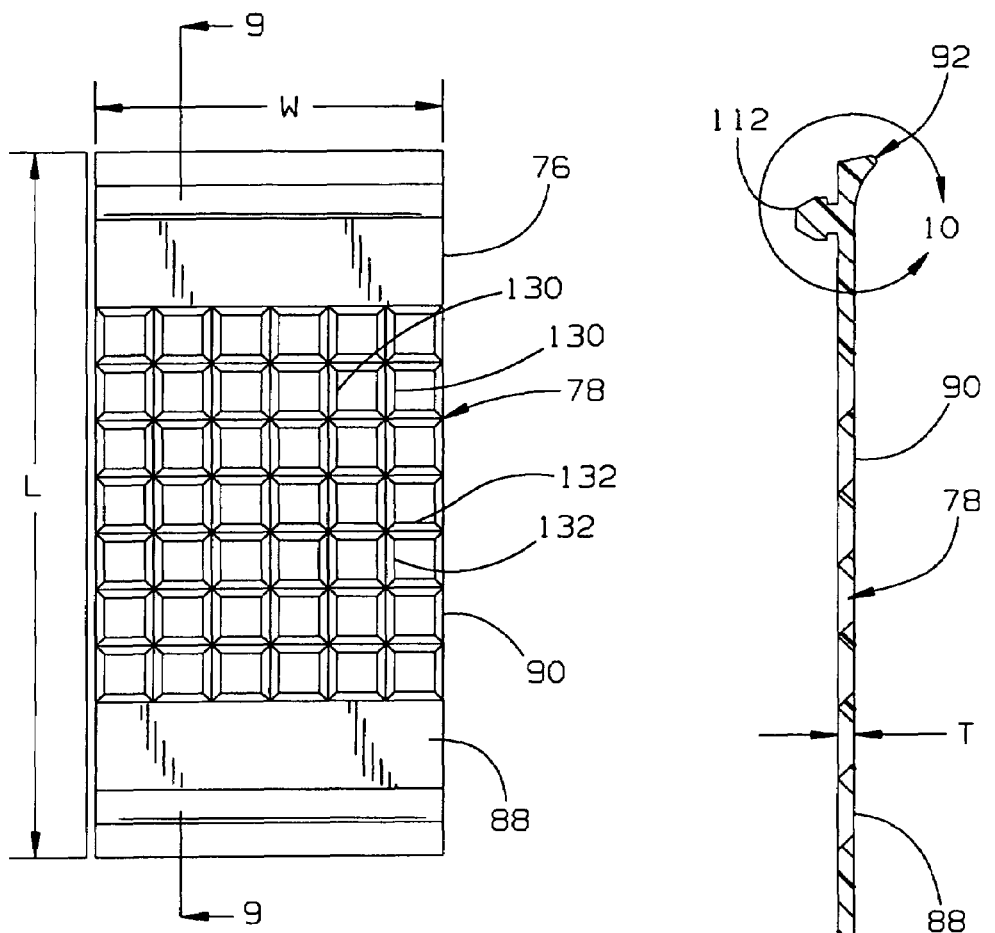
FIG. 8
FIG. 9
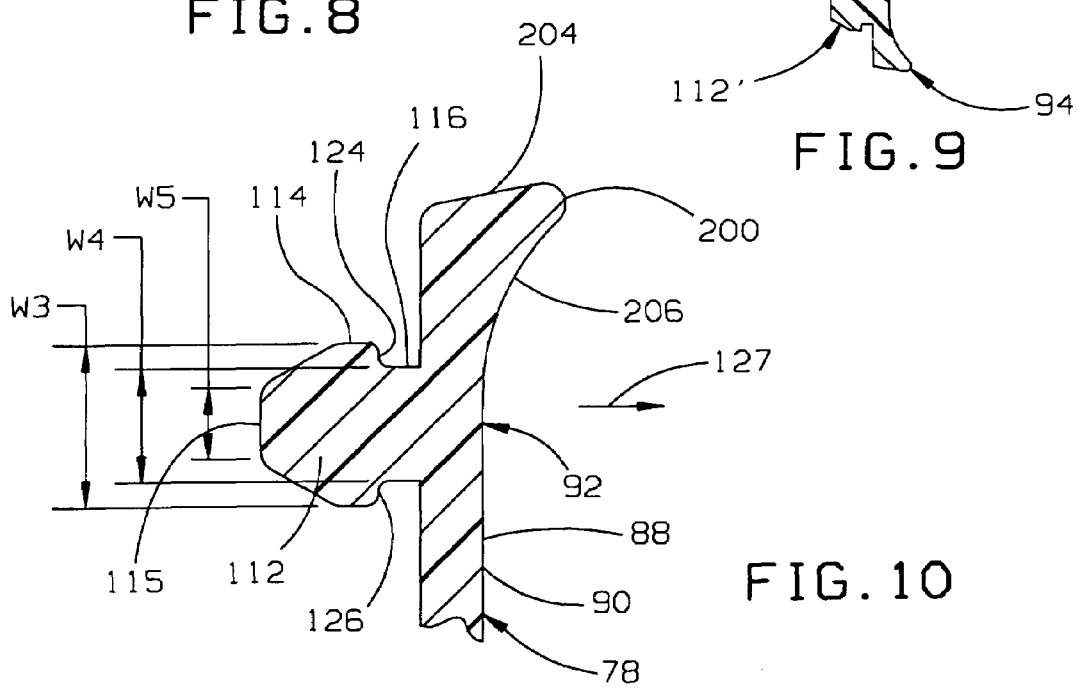
FIG. 10

ROLLER SAFETY SUPPORT SYSTEM FOR CONVEYOR SYSTEM

BACKGROUND OF THE INVENTION

1. Field of the Invention

This invention relates to conveyor systems of the type having a conveying belt trained around spaced guide rollers for movement in a predetermined travel path. More particularly, the invention is directed to a support system for a roller which bears supportingly against the conveying belt.

2. Background Art

Conveyor systems are used in a wide range of applications and in many diverse environments. In a typical conveyor system, a conveying belt is trained around spaced head and tail pulleys/rollers for continuous movement in a predetermined travel path. In a portion of the travel path, the conveying belt defines an upwardly facing supporting surface upon which articles/materials can be placed to transport the same from a loading location to another location, as dictated by the system configuration. Typically, the articles/materials will separate from the conveying belt at the location of the head roller for appropriate disposition, such as by transfer to another conveyor system for movement to yet another location. A significant expanse may exist between the head and tail pulleys/rollers. The unsupported belt, traveling in the return, underside, path portion is commonly borne supportingly upon by one, or a plurality of, rollers, commonly designated "idler rollers".

It is common to construct conveyor systems with sufficient space beneath the conveying belts for individuals to traverse. This type of system presents two potentially dangerous situations. First of all, the conveying belt, moving in the return path portion at each idler roller, creates a pinch point. The advancing conveying belt and each idler roller are advanced in the same general direction and converge to a pinch point. Inadvertent contact by anyone with the conveying belt at the return path portion, upstream of an idler roller, could draw a contacting limb or digit dangerously into the pinch point. The industry has long been aware of this problem. A number of guards have been designed to reduce the risk of injury at each idler roller location.

One such guard system blocks the converging geometry upstream of the pinch point. While a guard of this type addresses potential injury, it also introduces another operating problem. The guard system defines an obstruction that intercepts material that has not been cleaned from the conveying belt as it passes through the return path portion. This condition may eventually lead to the impairment of the system operation, particularly when the conveyed material is a particulate that has a tendency to bind. This condition may be aggravated by severe conditions in which the conveyor system operates, whereby the conveyed material is dampened and is resultingly bonded with greater tenacity to the conveying belt. This type of material may follow the conveying belt into its return path portion so that it progressively accumulates at the guard system to a point that the conveying belt movement and/or idler roller operation may be affected. This accumulation of material may also be sufficient that the idler roller may be forced to disengage from its operative position.

Conventional idler rollers have had a tendency to separate from their mounts in conveyor systems. These rollers may have a significant weight that could inflict injury upon anyone who is contacted by them. The industry has also been aware of this problem for some time. This has led to the development of certain guard systems which are designed to prevent potentially dangerous, unrestricted downward travel, of idler rollers that have disengaged from their operative positions.

One example of such a guard system is shown in U.S. Pat. No. 6,318,545 (Ross, II). Ross II has a trough-shaped element placed over each idler roller. In the event of separation, the idler roller will be intercepted and confined by the trough-shaped element.

Ross II also discloses structure for wiping the underside of the blade on both the upstream and downstream ends of the guard. This avoids the migration of foreign matter carried on the conveying belt into the receptacle defined by the trough-shaped element. However, it is inevitable that there will be some material that does find its way past the upstream wiper and into the roller receptacle bounded by the trough-shaped element. This progressive accumulation could ultimately fill the receptacle, which could block the movement of the idler roller and also potentially cause the entire roller mechanism, including the guard, to disengage from its support.

Another problem associated with these guard systems is that they must generally be designed for a specific roller configuration. That is, the "trough" that is defined generally is designed to optimally perform with a specific diameter of idler roller. Thus, these guard systems must each be designed and inventoried for use with a specific idler roller configuration. By reason of having to inventory different sizes of guard systems, inherently expenses are increased in terms of both a) manufacture and stocking and b) handling preparatory to sale.

Another problem with the fixed configuration guard systems is that they are generally made from metal materials for purposes of maintaining their integrity, even in harsh operating environments. Construction using metal is generally relatively expensive. Additionally, metal parts are prone to corrosion, particularly in environments in which conveying belts are commonly operated. That is, conveying systems are often operated in an exterior environment in which they are exposed to moisture, due to rain, snow, and/or high humidity. Further, the conveyed materials are also often corrosive to metal. If not monitored, the metal components in the guard systems may deteriorate to the point that they fail under the weight of a disengaged idler roller, whereby an operator is exposed to not only the danger of the falling idler roller, but the components of the guard systems.

Still further, metal components, while durable, are heavier than most of their non-metal counterparts. In overhead systems, installation of the guard system may be difficult and time consuming, by reason of the weight of certain components and/or the overall system.

There is currently underway a campaign by governing bodies in this industry to require guards to prevent personal injury in the vicinity of the idler rollers resulting from the above condition. Designers in this industry continue to seek ways to address safety issues without impairing the basic operation of the conveyor systems.

SUMMARY OF THE INVENTION

In one form, the invention is directed to a conveyor system having a conveying belt trained around a plurality of guide rollers for movement in an endless travel path to convey articles and materials in a travel line. A first roller is mounted in an operative position on a support to bear against the conveying belt. A roller safety support system has a wall assembly that confines downward movement of the first roller in the event that the first roller becomes disengaged from the operative position. The roller safety support system further includes a frame assembly. The wall assembly is mounted to the frame assembly so that an upwardly facing surface on the wall assembly bears supportingly against the first roller in the event that the first roller becomes disengaged from the operative position. The upwardly facing surface bounds a receptacle in which the first roller is confined by the wall assembly in the event that the first roller disengages from the operative position. The receptacle has a variable configuration.

In one form, the wall assembly has at least one opening therethrough to allow passage of discrete foreign material separated from the conveying system.

In one form, the wall assembly consists of a sheet that is connected to the frame assembly at spaced first and second locations to be in an operative state wherein the sheet sags under its own weight between the first and second locations at which the receptacle is defined.

In one form, there is a first support element at the first location and there are a cooperating first receptacle and first projection, one each on the first support element and sheet. The first projection resides in the first receptacle with the sheet in the operative state.

In one form, the first receptacle is in the form of a first elongate slot and the first projection is directed into the first elongate slot in a first direction in a first line transversely to the travel line to place the sheet in the operative state.

In one form, the first projection is directed into the first receptacle by movement in a first direction in a first line that is generally parallel to the travel line.

The first projection may be snap fit into and maintained in the first receptacle.

In one form, the sheet has a first neck on which the first projection is located. The first receptacle is defined by a first channel with a first wall having a first entry opening. The first neck, first projection, and first entry opening are relatively dimensioned and constructed so that at least one of the channel first projection is deformable and is deformed to an entry state as the first projection is pressed through the first entry opening into the first receptacle by movement of the projection in an assembly direction, whereupon the at least one of the channel and first projection that is deformed to an entry state is changed back towards an undeformed state wherein the first projection is blocked from being removed from the first receptacle by movement of the projection oppositely to the assembly direction.

In one form, the first receptacle is an elongate slot with a length extending transversely to the travel line and the first projection is elongate with a length extending generally parallel to the length of the elongate slot.

In one form, there is a second support element at the second location and there are a cooperating second projection and second receptacle, one each on the second support element and sheet.

The second projection may be snap fit into and thereby maintained in the second receptacle.

In one form, the first elongate slot is defined by a first channel with a first wall having a first entry opening. The sheet has a first neck on which the first projection is located. The first neck, first projection, and first entry opening are relatively dimensioned so that a) the first neck can pass through the first entry opening as the projection moves into the first slot by movement of the sheet relative to the frame assembly along the first line and b) the first projection is blocked from passing through the first entry opening by movement of the sheet transversely to the first line relative to the frame assembly without deforming at least one of the first wall and first projection to place the sheet in and remove the sheet from the operative state.

In one form, there is a second support element at the second location and the sheet has a second projection and a second neck which cooperate with the second support element in substantially the same manner as the first projection and first neck cooperate with the first support element.

In one form, the sheet defines a first edge for bearing against and cleaning the conveying belt as the conveying belt moves in the endless travel path.

In one form, the sheet has a second edge for bearing against and cleaning the conveying belt as the conveying belt moves in the endless travel path.

The second support element may have a second wall with a second entry opening corresponding to the first entry opening, with the first and second walls facing oppositely to each other.

In one form, the sheet has a plurality of openings therethrough bounded by a network of interconnecting elements that cause the sheet to be weakened so that the sheet can be readily reconfigured. The plurality of openings allow passage of discrete foreign material separated from the conveying system.

In one form, the frame assembly includes a first bracket that is attached to the first support to block movement of the first projection out of the first elongate slot by movement of the first projection oppositely to the first direction.

The first bracket may be attachable to the first support selectively at different positions along the first line.

The frame assembly may include a second bracket that is attached to the first support element to block movement of the first projection out of the slot by movement of the first projection in the first direction relative to the second support element.

The conveyor system may further include a base, with the first and second brackets mounted to the base to maintain the roller safety support system in operative relationship with the first roller.

The first roller has a first rotational axis. The first bracket may extend around the first axis so that an axial end of the first roller is unobstructed by the first bracket as viewed along the first rotational axis.

The first bracket and first support may be fixed to each other selectively at a plurality of different relative vertical positions.

In one form, the support element is in the form of a first channel. The first bracket has walls with facing surfaces. The first channel is confined in a vertical direction between the facing wall surfaces on the first bracket.

In one form, the first bracket has a C shape with first and second free ends projecting towards each other and one of the free ends defines one of the facing walls.

In one form, the sheet is made from urethane.

In one form, the frame assembly includes a first bracket. The conveyor system has a base to which the first bracket is mounted to maintain the roller safety support system in operative relationship with the first roller. The frame assembly has a first support element for the wall assembly. The receptacle is variable in configuration by vertically repositioning the first support element relative to the first bracket.

In one form, the wall assembly has a sheet with a fixed, curved configuration bounding the receptacle.

In another form, the invention is directed to a conveyor system having a conveying belt trained around a plurality of guide rollers for movement in an endless travel path to convey articles and materials in a travel line. A first roller is mounted in an operative position on a support to bear against the conveying belt. A roller safety support system has a wall assembly that confines downward movement of the first roller in the event that the first roller becomes disengaged from the operative position. The roller safety support system further includes a frame assembly. The wall assembly is mounted to the frame assembly so that an upwardly facing surface on the wall assembly bears supportingly against the first roller in the event that the first roller becomes disengaged from the operative position. The upwardly facing surface bounds a receptacle. The wall assembly is mounted to the frame assembly through at least one cooperating pair of a projection and receptacle on the wall assembly and frame assembly which permit the wall assembly to be placed and maintained in an operative state relative to the frame assembly.

In one form, the wall assembly is in the form of a sheet that is connected to the frame assembly at spaced first and second locations to be in the operative state, wherein the sheet sags under its own weight between the first and second locations at which the receptacle is defined.

In one form, the sheet is connected to the frame assembly in an operative state at spaced first and second locations. The wall assembly is connected to the frame assembly at the first location and is pivotable upwardly to be connectable to the frame assembly at the second location.

In one form, the wall assembly is snap connected to the frame assembly at the second location.

In one form, there are cooperating first receptacle and first projection, one each on the first sheet and frame assembly, at the second location. The first projection resides in the first receptacle with the sheet in the operative state.

In one form, the first receptacle is an elongated first slot with a length extending transversely to the travel line and the first projection is elongate with a length extending generally parallel to the length of the first elongate slot.

In one form, there are a cooperating second receptacle and second projection, one each on the first sheet and frame assembly, at the first location. The second projection resides in the second receptacle with the sheet in the operative state.

The second projection may be snap fit into and thereby maintained in the second receptacle.

The second receptacle may be in the form of an elongate second slot with a length extending transversely to the travel line, with the second projection being elongate with a length extending generally parallel to the length of the second elongate slot.

In one form, there is a repositionable first support element at the first location and there are a cooperating first receptacle and first projection, one on the first support element and sheet, with the first projection residing in the first receptacle with the sheet in the operative state.

The first project may be directed into the first receptacle in a first direction in a first line transversely to the travel line to place the sheet in the operative state.

In one form, the first receptacle is defined by a first channel with a first wall having a first entry opening. The sheet has a first neck on which the first projection is located. The first neck, first projection, and first entry opening are relatively dimensioned so that a) the first neck can pass through the first entry opening as the first projection moves into the first slot by movement of the sheet relative to the frame assembly along the first line and b) the first projection is blocked from passage through the first entry opening by movement of the sheet transversely to the first line relative to the frame assembly with the sheet in the operative state.

A second support element may be provided at the second location, with the sheet having a second projection and a second neck which cooperate with the second support element in substantially the same manner as the first projection and first neck cooperate with the first support element.

In one form, the sheet defines a first edge for bearing against and cleaning the conveying belt as the conveying belt moves in the endless travel path.

In one form, the second support element has a second wall with a second entry opening corresponding to the first entry opening and the first and second walls face oppositely to each other.

The sheet may have a plurality of openings therethrough bounded by a network of interconnecting elements that cause the sheet to be weakened so that the sheet can be readily reconfigured. The plurality of openings allow passage of discrete foreign material separated from the conveying system.

In one form, the frame assembly includes a first bracket that is attached to the first support element to block movement of the first projection out of the first slot by movement of the first projection oppositely to the first direction.

The first bracket may be attachable to the first support element selectively at different positions along the first line.

In one form, the first bracket and first support element can be fixed to each other selectively at a plurality of different relative vertical positions.

The sheet may be made from a urethane material.

In one form, the frame assembly includes a first bracket and the conveyor system has a base to which the first bracket is mounted to maintain the roller safety support system in operative relationship with the first roller. The frame assembly has a first support element for the wall assembly. The receptacle is variable in configuration by vertically repositioning the first support element relative to the first bracket.

The wall assembly may include a sheet with a first curved configuration bounding the receptacle.

The wall assembly may be flexible to allow reconfiguration of the upwardly facing surface.

BRIEF DESCRIPTION OF THE DRAWINGS

FIG. 8 is an enlarged, top view of the inventive wall assembly;

FIG. 9 is an enlarged, cross-sectional view of the wall assembly taken along line 9-9 of FIG. 8;

FIG. 10 is an enlarged view of a connecting portion on the inventive wall assembly within the circle of FIG. 9;

FIG. 21 is a schematic representation of a modified form of roller safety support system, according to the present invention, including a fixed configuration wall assembly.

DETAILED DESCRIPTION OF THE DRAWINGS

Figure 1:
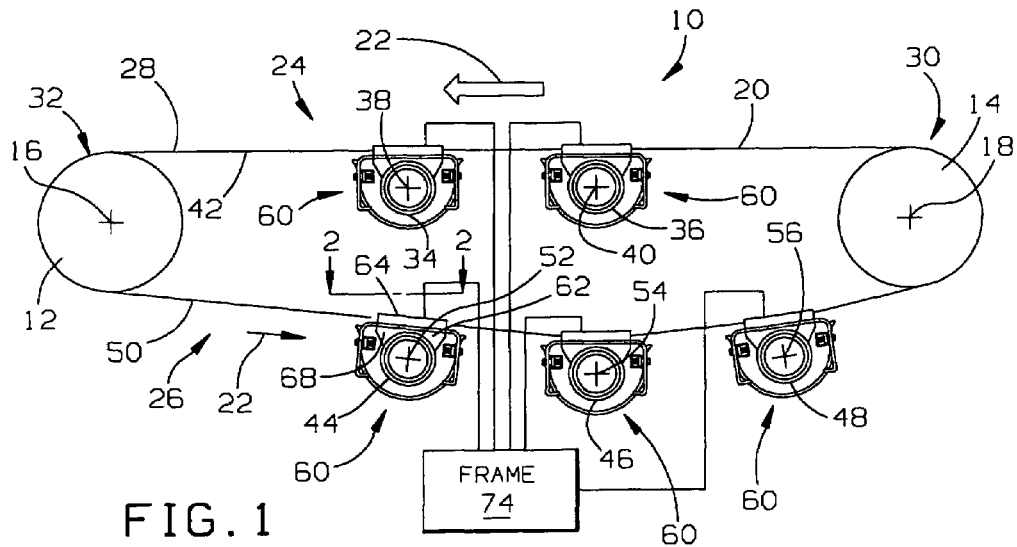
FIG. 1 is a partially schematic, side elevation view of a conveyor system, consisting of a conveying belt trained around a plurality of guide rollers for movement of in an endless travel path, and support/idler rollers acting thereagainst, and incorporating a roller safety support system at each support/idler roller location, according to the present invention.

In FIG. 1, a conveyor system, of a type suitable for incorporation of the present invention, is shown at 10. The conveyor system 10 consists of a head roller 12 and a tail roller 14, arranged in spaced relationship so as to be rotatable about parallel axes 16, 18, respectively. A conveying belt 20 is trained around the head and tail rollers 12, 14 for movement in a continuous, predetermined travel path, as indicated by the arrows 22. The travel path for the conveying belt 20 includes a conveying path portion 24 and an underlying, return path portion 26. In the conveying path portion 24, the conveying belt 20 has an upwardly facing surface 28 which supports articles and/or particulate material, or the like, which are transported by the conveying belt 20 in a travel line between spaced locations. The conveying range along the travel line is dictated by the length of the conveying path portion between upstream and downstream conveying locations, identified at 30 and 32, respectively. The conveying belt 20 returns in the underlying path portion 26.

Typically, articles and/or particulate material will be introduced at a location between the rollers 12,14, and will separate from the conveying belt 20 at the downstream conveying location 32, where the conveyor belt 20 moves downwardly around the head roller 12, for appropriate disposition, as by accumulation or transport to another conveyor system (not shown).

To support the conveying belt 20 in the conveying path portion 24 between the head and tail rollers 12,14, one or more, and in this case two, support/idler rollers 34,36 are mounted for pivoting movement about axes 38,40, respectively, which axes 38,40 are generally parallel to the head and tail roller axes 16,18. The support/idler rollers 34,36 bear on the otherwise unsupported underside 42 of the conveying belt 20 between the head and tail rollers 12,14. The support/idler rollers 34,36 limit the extent of belt sag between the head and tail rollers 12,14 and also support the conveying belt under impact forces applied, as through loading.

Similar support/idler rollers 44,46,48 are mounted to bear on the downwardly facing surface 50 of the conveying belt 20 in the underlying return path portion 26 between the head and tail rollers 12,14. The support/idler rollers 44,46,48 are movable about axes 52,54,56, respectively, which are substantially parallel to each other and to the axes 16,18 for the head and tail rollers 12, 14. The function of the support/idler rollers 44,46,48 is the same as for the support/idler rollers 34,36. However, the support/idler rollers 44,46,48 are not subjected to any significant vertical forces at their respective locations, other than those imparted by the weight of the conveying belt and any material adhered thereto.

Each support/idler roller 34,36,44,46,48 has an associated roller safety support system 60. The roller safety support system 60 is the same for each of the associated support/idler rollers 34,36,44,46,48. However, a roller safety support system 60 may not be incorporated at each location where a support/idler roller is provided. Further, the depicted locations for the support/idler rollers 34,36,44,46,48 are exemplary only. A support/idler roller may be provided at any location between the rollers 12,14, in the conveying path portion 24 and/or the return path portion 26.

Figure 2:
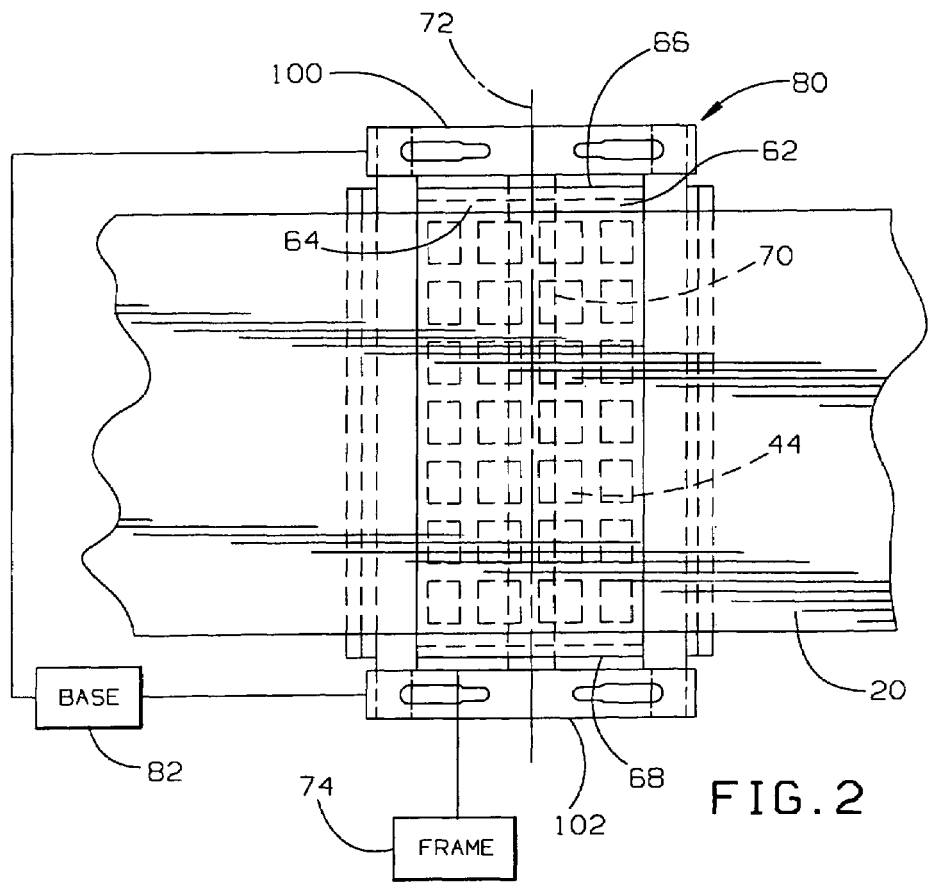
FIG. 2 is an enlarged, fragmentary, plan view of a portion of the cleaning belt of FIG. 1 over a support/idler roller, acting thereagainst, and with the inventive roller safety support system in operative relationship to the support/idler roller.

Since the support/idler rollers 34,36,44,46,48 may have the same construction, and cooperate with the roller safety support system 60 in the same manner, the description herein will be limited to the mounting of exemplary support/idler roller 44 and its cooperation with the roller safety support system 60. The details of the support/idler roller 44, and its cooperation with the roller safety support system 60, are shown additionally in FIGS. 2-20. As seen in FIGS. 1 and 2, the support/idler pulley 44 is mounted through a bracket 62 having a main body 64 with depending flanges 66,68. A shaft 70 spans the flanges 66,68 and supports the support/idler roller 44 for rotation about an axis 72. The bracket 62 is attached to a frame 74. The frame 74 may be independently supported, or maintained in its operative position, in conjunction with other conveyor system components, on a common support. The conveying belt 20 passes between the underside of the main body 64 of the bracket 62 and the support/idler roller 44.

The roller safety support system 60 is mounted beneath the support/idler roller 44 and is designed to intercept the support/idler roller 44 in the event that the same becomes disengaged from the operative position shown in FIGS. 1 and 2. The roller safety support system 60 consists of a wall assembly 78 mounted to a frame assembly at 80. The frame assembly 80 in turn is mounted to a base 82 so as to maintain the roller safety support system 60 in operative relationship with the support/idler roller 44. The base 82 may be an independent structure, part of the frame 74, or otherwise constructed to provide a foundation for the roller safety support system 60. With the roller support assembly 60 in operative relationship with the support/idler roller 44, the wall assembly 78 has a surface 84, bounding at least a part of a receptacle 86, situated beneath the support/idler roller 44, so that the wall assembly 78 intercepts, and thereby confines downward movement of, the support/idler roller 44 in the event that the same becomes disengaged from the operative position therefor.

The wall assembly 78 is in the form of a sheet 88 having a generally rectangular shape with a length L and a width W (FIG. 8). The sheet 88 has a main portion 90 with a substantially uniform thickness T, which blends into connecting portions 92,94, adjacent to the lengthwise ends of the main portion 90.

As seen particularly in FIGS. 3-5, 11, and 14-20, the connecting portions 92,94 are engaged, one each, with support elements 96,98, at spaced locations on the frame assembly 80. The support elements 96,98, which are each shown as identical channels, are maintained in their spaced relationship by spaced, C-shaped brackets 100,102, which are secured to the base 82.

The exemplary channel 96 is elongate, with the length thereof extending in a line L (FIG. 3) that is generally orthogonal to the travel line for the conveying belt 20. The channel 96 has a squared, cross-sectional shape with an internal hollow defining a receptacle, in the form of a slot 104 extending along the entire length thereof. The slot 104 has a width W (FIG. 4) in the vertical direction. The channel 96 has ends 106,108 which are in-turned so as to define an entry opening 110 to the slot 104 with a vertical width dimension W1 that is less than the width W.

The channel 96 is designed to cooperate with the connecting portion 92 on the wall assembly 78. The connecting portion 92, as seen most clearly in FIG. 10, consists of a projection 112 having an enlarged portion 114, with a vertical width W3, and is connected to the main portion 90 of the sheet 88 through a neck 116 having a vertical dimension W4. The enlarged portion 114 tapers to a free end 115 with a vertical dimension W5. The width W3 is selected so that the projection 112 can move within the slot 104 parallel to the line L. The neck dimension W4 is less than the vertical width dimension W1 for the entry opening 110 so that the neck 116 can slide freely within the entry opening 110 along the line L.

Figure 15:
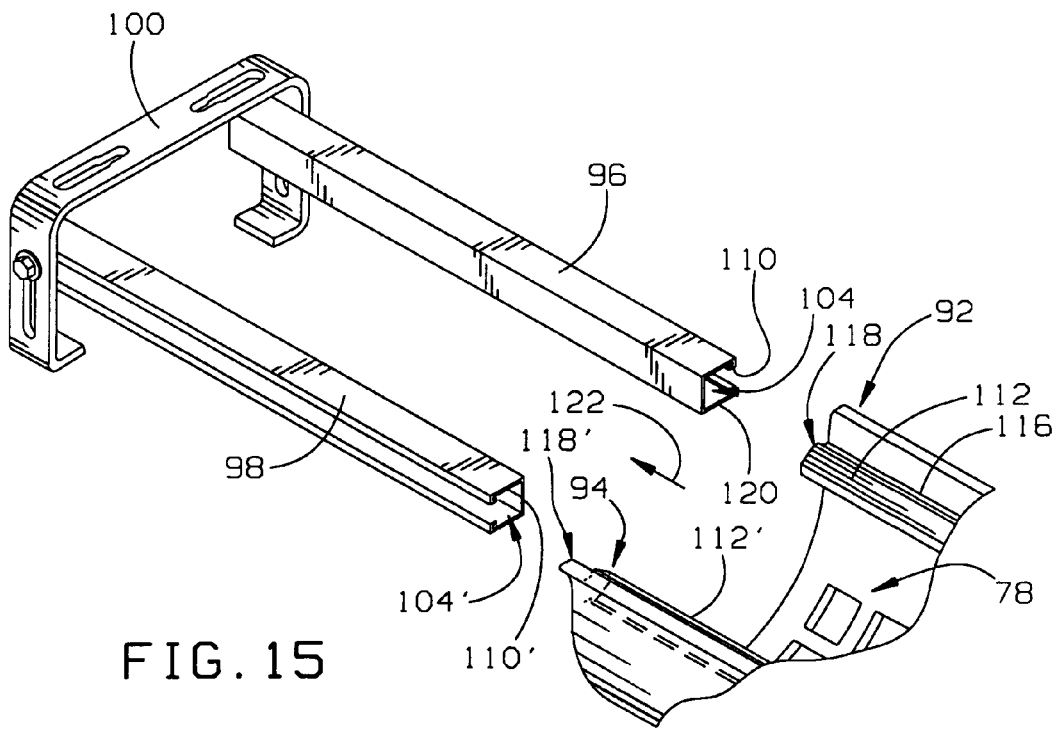
FIG. 15 is an enlarged, exploded, perspective view of the channels on the frame assembly with one bracket in place and one removed and the wall assembly separated from the operative state.

With this arrangement, one end 118 of the connecting portion 92 can be presented at the channel end 120, with the projection 112 aligned with the slot 104 and the neck 116 aligned with the entry opening 110, as seen in FIG. 15. By then translating the connecting portion 92, in the direction of the arrow 122 along the line L, the entire length of the projection 112 can be directed into the channel slot 104. The transition between the enlarged portion 114 and neck 116 defines vertically spaced shoulders 124,126, which block withdrawal of the projection 112 from the slot 104 through the entry opening 110 by movement of the projection 112 transversely to the line L relative to the channel 96 in the direction of the arrow 127 in FIG. 10. More specifically, the shoulders 124,126 become blocked by the channel ends 106,108, respectively, to prevent separation of the connecting portion 92 from the channel 96 by other than relative translational movement along the line L, or by a forced deformation of at least one of the projection 112 or channel 96, as hereinafter described.

Figure 4:
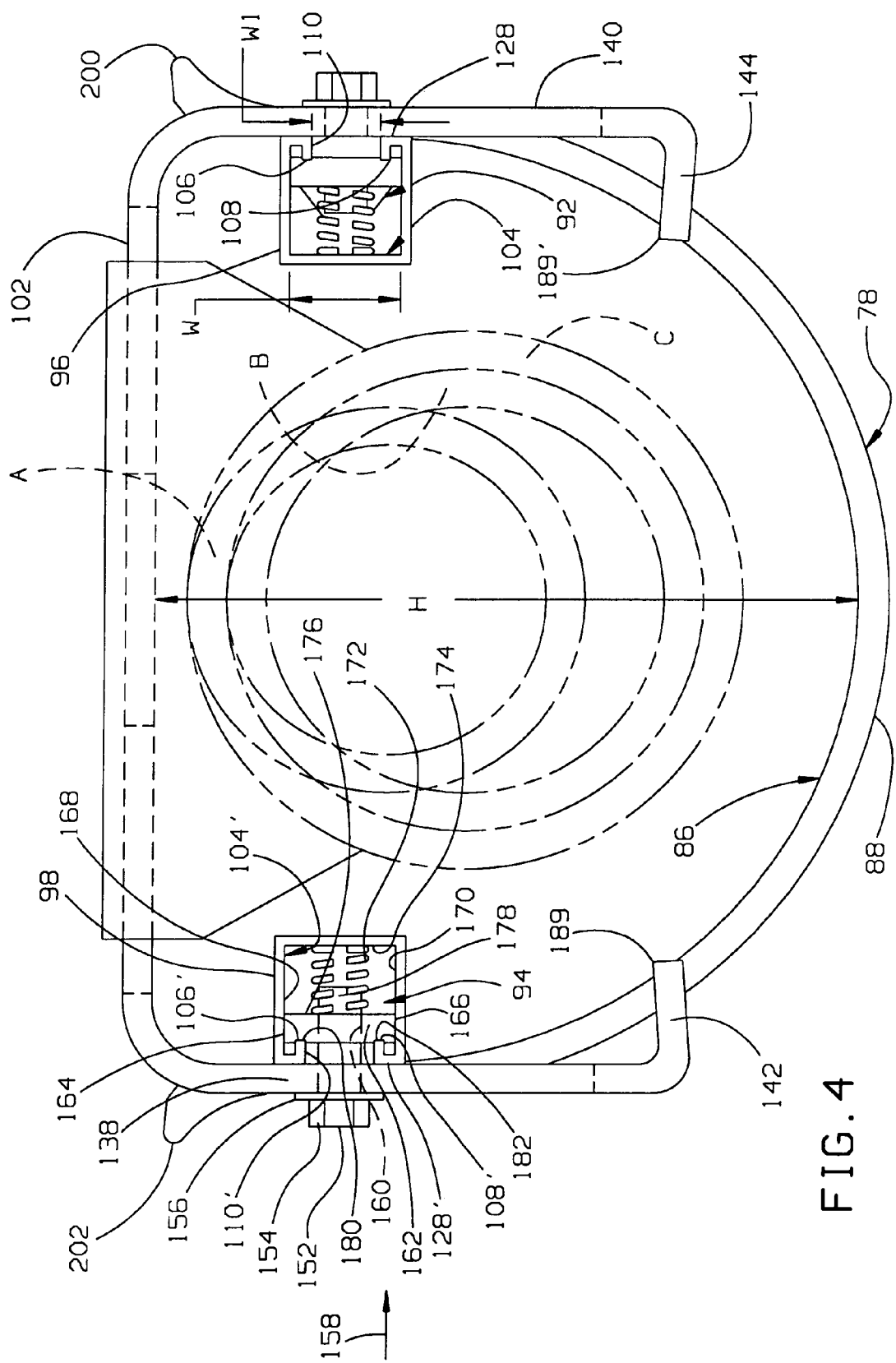
FIG. 4 is an enlarged, side elevation view of the roller safety support system in FIG. 3 with a wall assembly thereon configured to a first shape to define a receptacle for the support/idler roller, with a number of different roller diameters, that can be accommodated, shown in phantom lines therein.

The connecting portion 94 has a corresponding projection 112' which cooperates with the channel 98 in the same manner as the connecting portion 92 cooperates with the channel 96. The channel 98 has an entry opening 110', corresponding to the entry opening 110. As seen in FIG. 4, the entry opening 110 extends through a wall with a surface 128 that faces oppositely to a wall surface 128' on the channel 98, through which the entry opening 110' is formed.

In the embodiment shown, the wall assembly 78 is formed as a single piece, preferably from a non-metal material, such as urethane. The thickness T of the main portion 90 of the sheet 88 is selected so that the main portion 90 can be easily reconfigured to effect installation. The wall assembly 78 can be molded as a single piece in a generally flat shape and thereafter bent into a curved shape which allows the end 118 of the connecting portion 92 to be aligned with the slot 104 and a corresponding end 118' on the connecting portion 94 to be aligned with a slot 104' in the channel 98, as shown in FIG. 15. The wall assembly 78 can then be translated along the line L relative to the channels 96,98, in the direction indicated by the arrow 122 in FIG. 15, into the state shown in FIGS. 3 and 14, wherein the projections 112,112' reside fully within the slots 104,104'.

The main sheet portion 90 has a plurality of openings 130 formed therethrough to allow passage of foreign material separated from the conveying system 10 during operation thereof. In this embodiment, there are a plurality of openings 130 defined by a regular network of straight elements 132. This configuration accomplishes two objectives. First, it allows the foreign material to pass through the wall assembly 78 so that there is no significant accumulation within the receptacle 86. Secondly, the openings 130 make the main sheet portion more flexible so that it can be easily conformed into the curved, U shape, shown in FIG. 3, as required to effect installation. At the same time, there is sufficient strength maintained so that the wall assembly 78 will bear the weight of the support/idler roller 44 in the event that the same becomes disengaged from the operative position therefor. This flexibility adds another dimension to the invention in that the main sheet portion 90 will tend to vibrate in response to system operation, thereby causing matter captured in the receptacle 86 to break up and be sifted through the sheet 88. Still further, by reason of making the wall assembly 78 from a non-metal material, the same is not prone to corroding, as would a metal counterpart.

However, it should be understood that while the wall assembly 78 is shown to be formed by molding a single piece, the wall assembly could be constructed with a fixed configuration, shown schematically at 78' in FIG. 21 for connection to a corresponding frame assembly 80. The particular shape of the main portion 90 of the sheet 88 is not critical to the present invention, so long as a suitable receptacle is defined thereby to support the support/idler roller 44 in the event that it becomes disengaged alone, or together with the bracket 62.

As a further modification, the location of the projections 112,112' and slots 104,104' could be reversed. That is, the slots could be provided on the wall assembly 78, with the projections provided on the channels 96,98.

Figure 3:
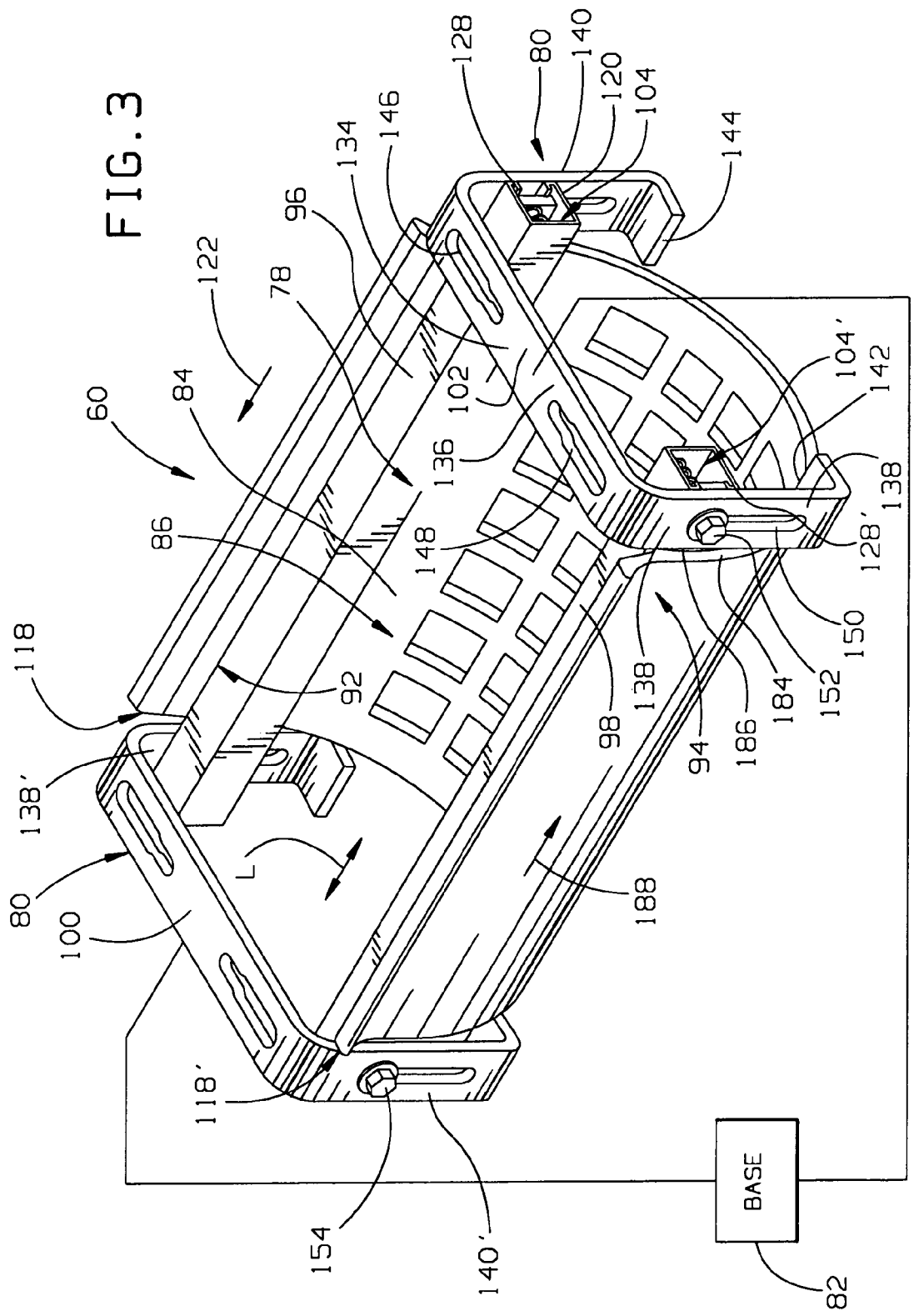
FIG. 3 is an enlarged, perspective view of the roller safety support system in FIGS. 1 and 2.

The brackets 100,102 have the same configuration and serve two purposes. Each bracket 100,102 serves as a means for mounting the roller safety support system 60 to the base 82. Additionally, each bracket 100,102 blocks movement of the wall assembly 78 relative to the frame assembly 80 along the line L in one direction with the wall assembly 78 in the operative state relative to the frame assembly 80, as shown in FIG. 3.

Figure 12:
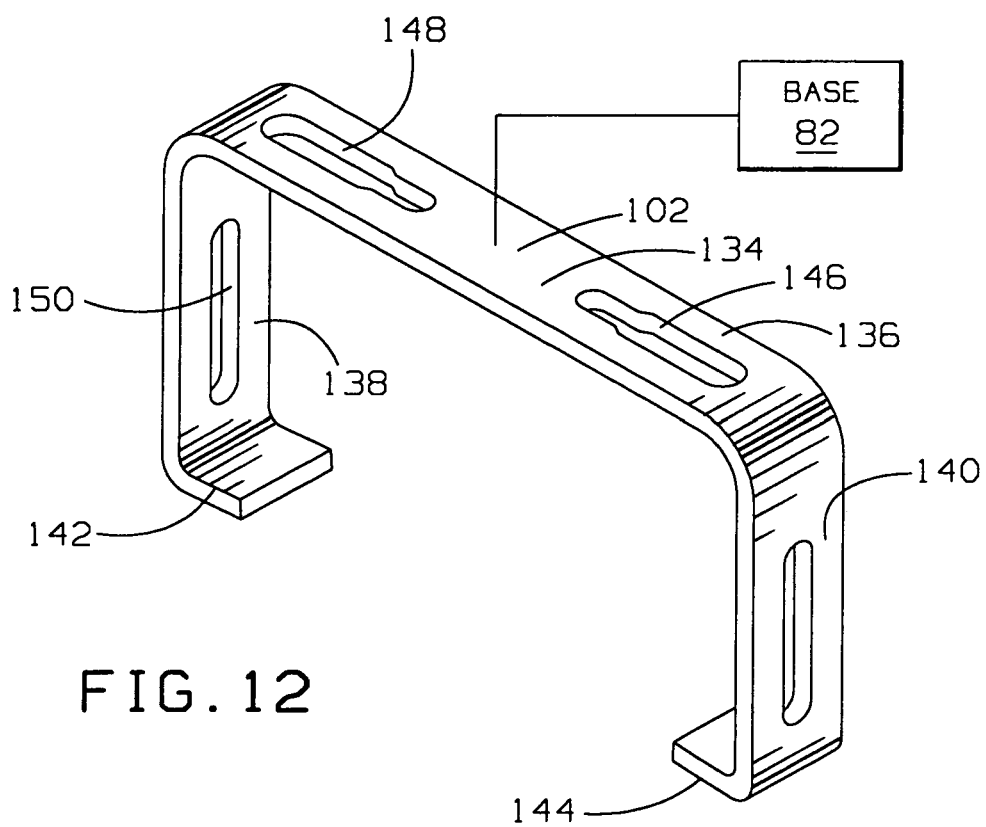
FIG. 12 is an enlarged, perspective view of one of two brackets that connects to the channel in FIG. 11 and cooperate with a base to maintain the roller safety support system in an operative position relative to the support/idler roller.
Figure 13:
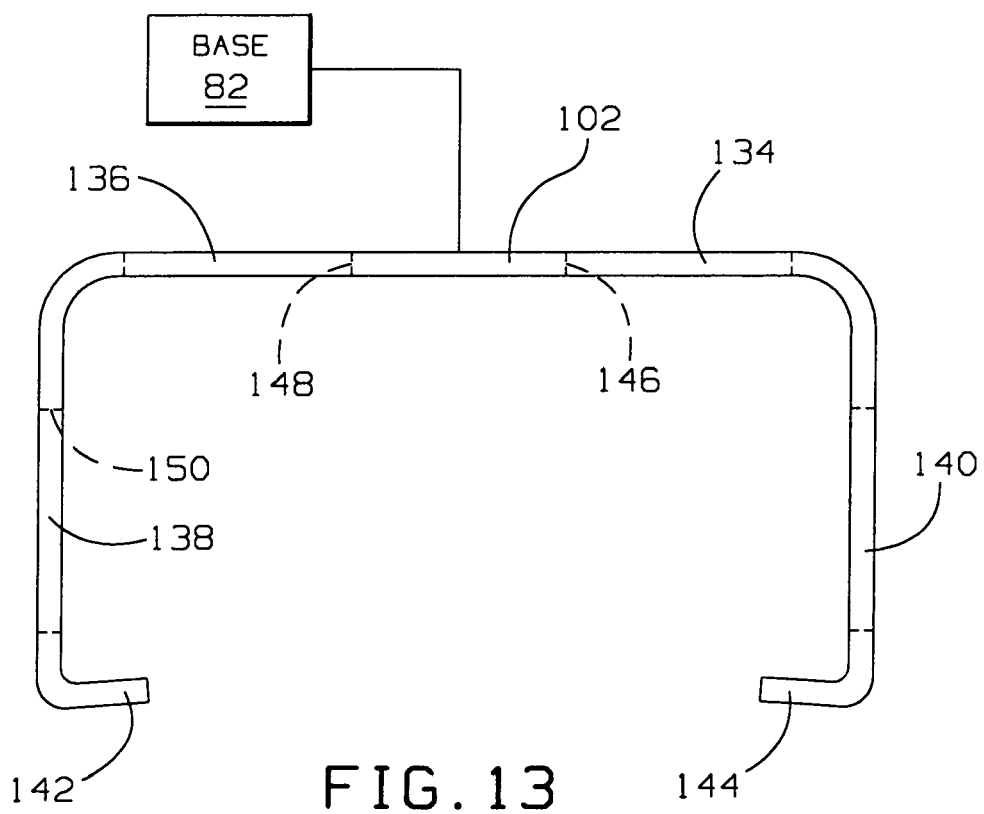
FIG. 13 is an enlarged, side elevation view of the bracket in FIG. 12.

The exemplary bracket 102, as seen clearly in FIGS. 12 and 13, has a body 134 with a horizontal mounting wall 136 which blends into spaced side walls 138,140, which terminate at free end walls 142,144, which project towards each other from the side walls 138,140, respectively, and are toed slightly upwardly. The horizontal mounting wall 136 has openings 146,148 to accommodate fasteners through which the bracket 102 is secured to the base 82. The manner of doing this is not critical to the present invention. The depicted arrangement of the horizontal mounting wall 136, and openings 146,148 therethrough, is designed to adapt to different base mounting configurations currently used in the industry.

The combined structure of the side wall 138 and free end wall 142 is a mirror image of the combined side wall 140 and free end wall 144. In the exemplary, combined side wall 138 and free end wall 142, the side wall 138 is provided with an elongate, vertically extending slot 150 therethrough to accommodate a threaded fastener 152. The fastener 152 has an enlarged, polygonally-shaped head 154 with a washer 156 that is separately formed or formed integrally therewith, to block passage of the head 154 in the direction of the arrow 158 in FIG. 4 through the slot 150.

As seen on the channel 98 in FIG. 4, the threaded fastener 152 is directed through the slot 150 into a complementarily-threaded throughbore 160 in a slider 162. The slider 162 has flat surfaces 164,166 that face oppositely and closely abut to oppositely facing surfaces 168,170 bounding the vertical dimension of the slot 104'. The slider 162 is biased towards the entry opening 110' by a compression coil spring 172 interposed between a channel surface 174 facing the entry opening 110', and a facing surface 176 on the slider 162. Through this arrangement, the slider 162 is normally biased against channel ends 106',108', corresponding to the channel ends 106,108, previously described. The slider 162 has a stub shaft 178 thereon which projects into the coil spring 172 to maintain the coil spring 172 in place relative thereto.

The fastener 152 can be directed through the slot 150 and into the bore 160 on the slider 162. By tightening the fastener 152, the slider 162 is drawn towards the bracket side wall 138 so that the channel ends 106',108' become firmly captive between the wall 138 and slider 162. The free edges 180,182, on the ends 106',108', respectively, tend to dig into the slider 162 to effect a positive connection therebetween. With this arrangement, the free end 184 (FIG. 3) of the wall assembly 78 is blocked by the edge 186 of the side wall 138 on the bracket 102 in FIG. 3 against further movement relative to the frame assembly 80 along the line L, in the direction of the arrow 188 in FIG. 3.

With the fastener 152 loosened, the bracket 102 can be slid lengthwise, in the line of the arrow L, transversely, and in this case orthogonally, to the travel line for the conveying belt 20, along the channel 98 and secured in any of a number of desired lengthwise positions therealong. Further, with the fastener 152 loosened, the channel 98 can be moved vertically relative to the bracket 102 and again fixed at a desired vertical position therealong. This latter adjusting capability allows the receptacle 86 to be reconfigured in addition to the reconfiguration made possible by the flexible nature of the sheet 88.

Figure 5:
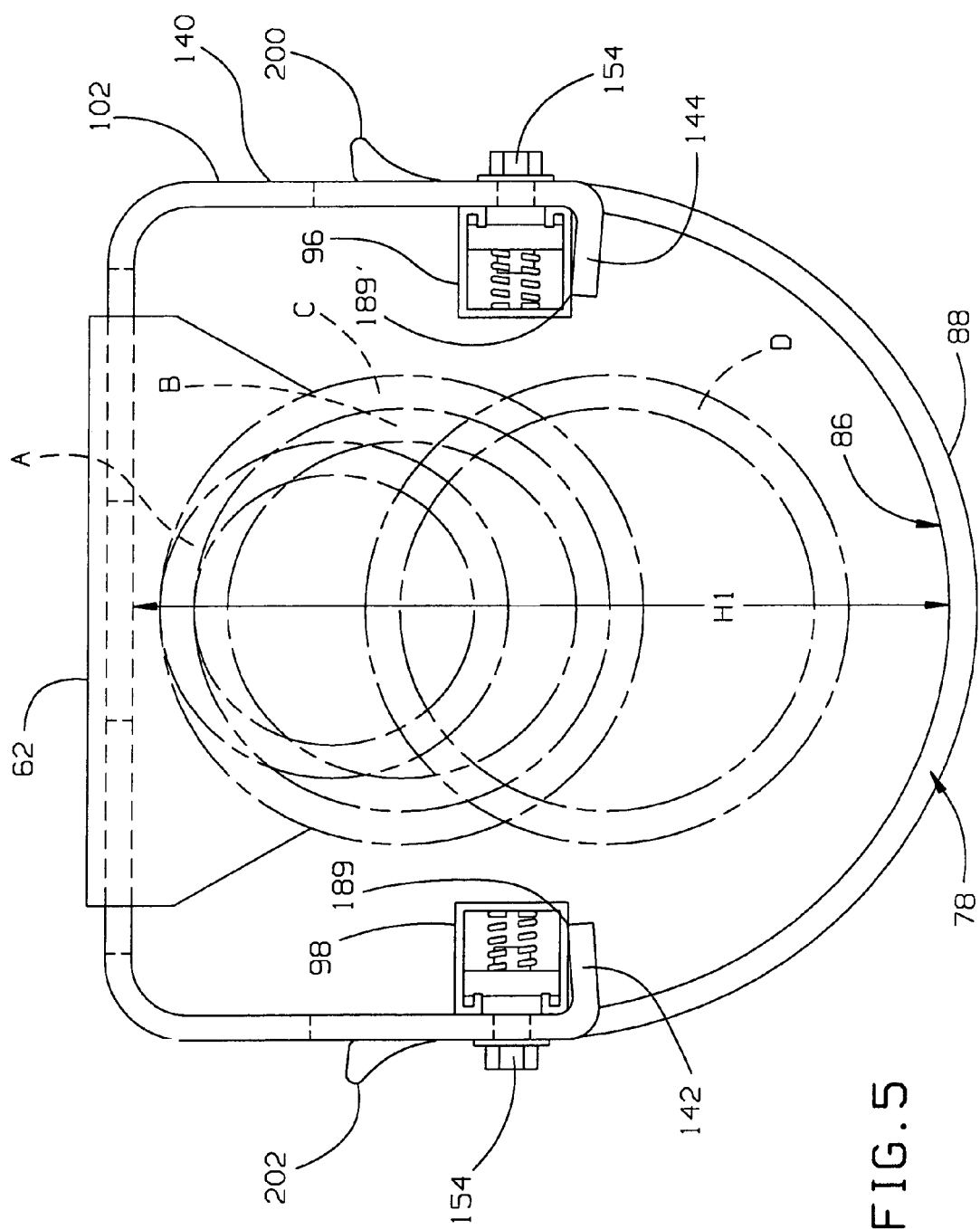
FIG. 5 is a view as in FIG. 4 with the wall assembly repositioned so that the receptacle has a different shape than in FIG. 4.
Figure 6:
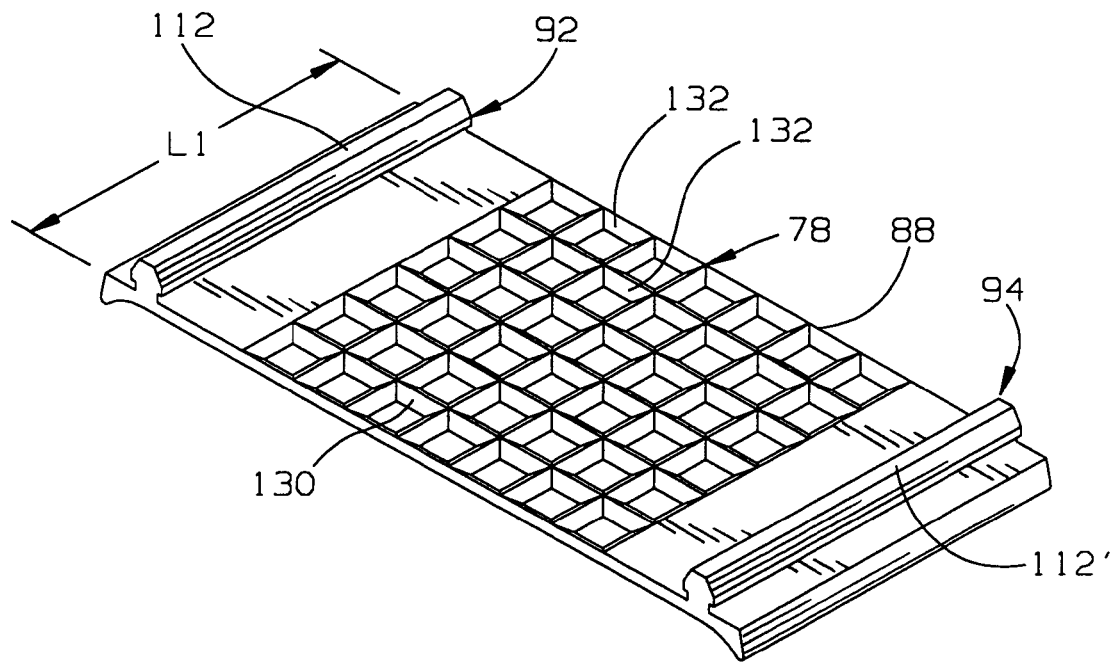
FIG. 6 is an enlarged, top, perspective view of the inventive wall assembly.
Figure 7:
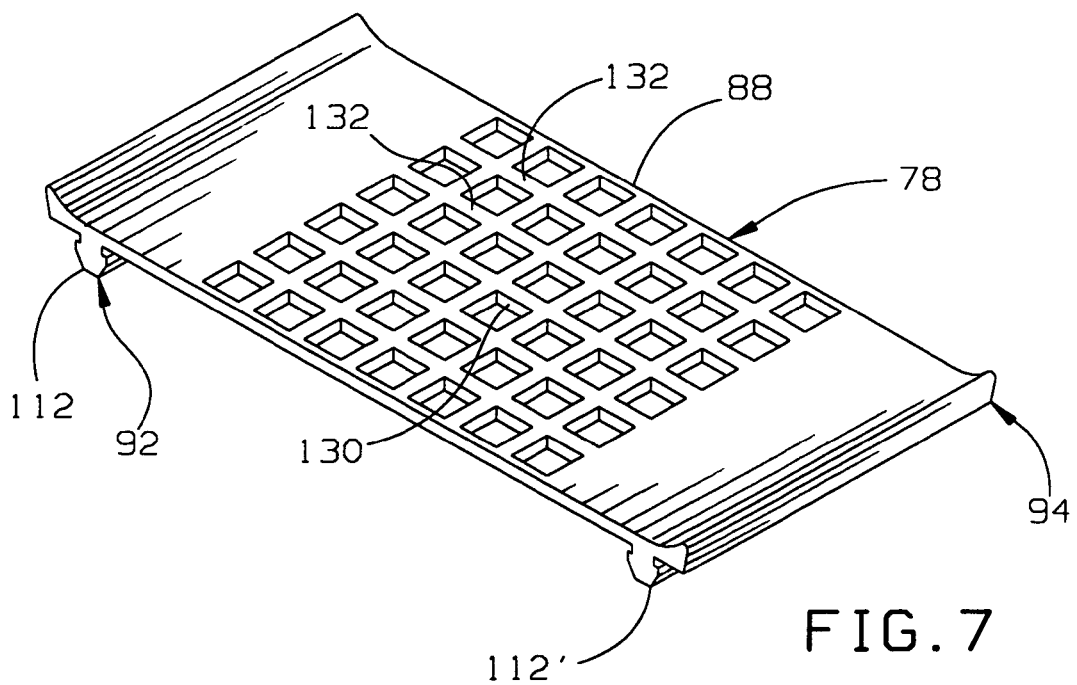
FIG. 7 is an enlarged, bottom, perspective view of the inventive wall assembly.
Figure 11:
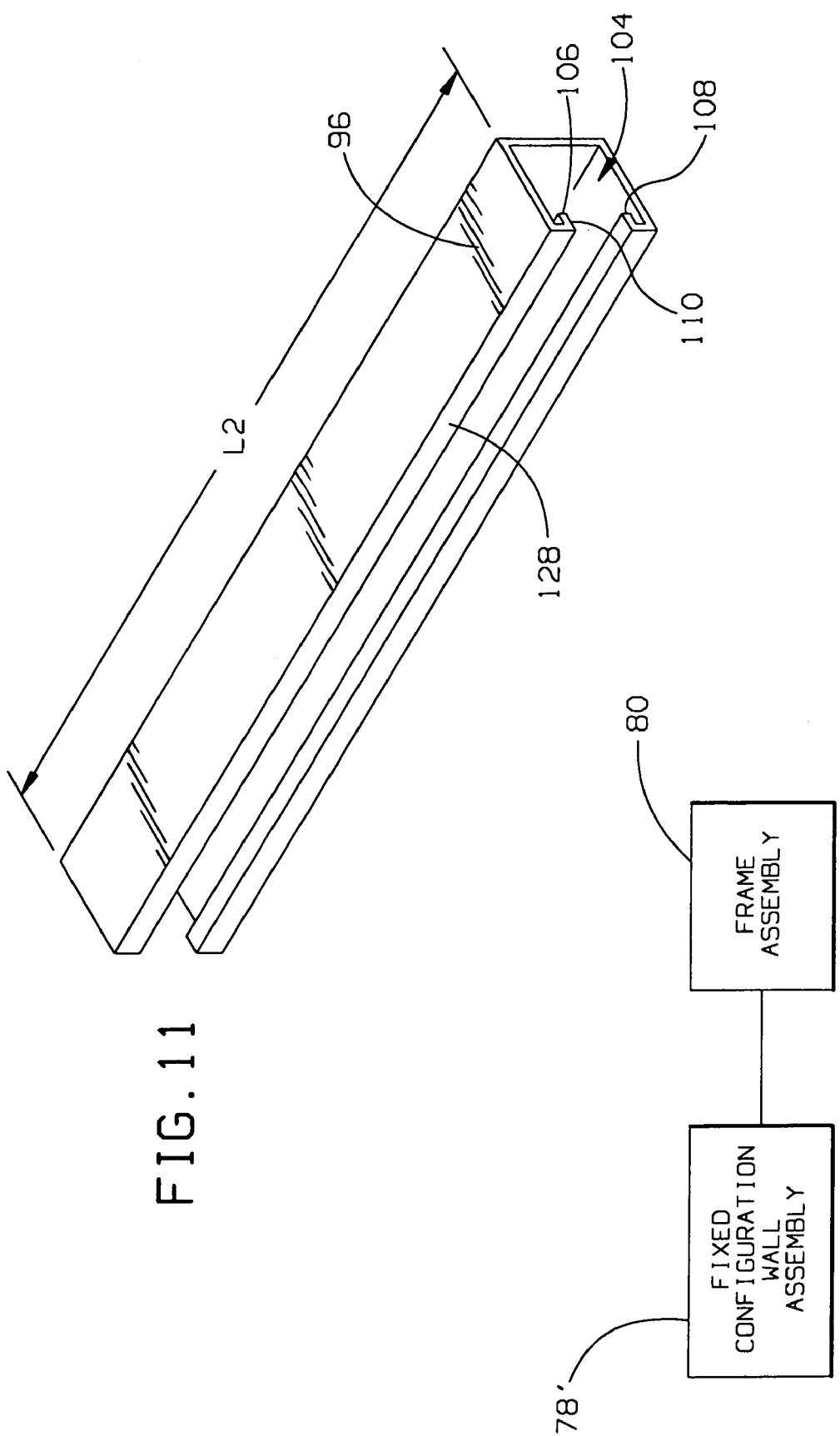
FIG. 11 is an enlarged, perspective view of one of two channels on the frame assembly for cooperating with the connecting portion in FIG. 10 to maintain the wall assembly in an operative state on the frame assembly.

More specifically, as seen in FIG. 4, with the channel 98 elevated to the highest possible position permitted by the slot 150, the receptacle 86 has an effective vertical dimension H. By lowering the channel 98 relative to the bracket 102, to the lowest possible position, as shown in FIG. 5, the channel 96 abuts to an edge 189 on the free end wall 142 so that the receptacle 86 has a vertical dimension H1. The upward tilt of the free end wall 142 provides greater vertical rigidity. In the FIG. 5 configuration, the roller safety support system 60 is capable of accommodating support/idler rollers that are mounted in a lower position. Three exemplary diameters for the support/idler rollers are shown as A, B, and C in FIG. 4, with two different operating axes therefor. In FIG. 5, the larger vertical dimension of the receptacle 86 accommodates not only the support/idler rollers A,B,C, but additionally a support/idler roller shown at D, that is mounted with its central axis significantly lower than for the support/idler roller A,B,C. The depicted arrangement has a generally universal construction, which allows use of the safety support system 60 with support/idler rollers of different diameter as well as those with different vertical mounting heights relative to the conveying belt 20, as commonly offered by current manufacturers of these systems. The axial ends of the rollers A, B, C, D remain unobstructed by the brackets 100, 102, whereby the rollers A, B, C, D might be conveniently accessed for repair and/or replacement.

The side wall 140 on the bracket 102 is connected to the channel 96 in like fashion. Similarly, as seen in FIG. 3, the bracket 100 has side walls 138',140' connected to the channels 96,98, respectively, utilizing the same structure, including the fasteners 154.

Figure 14:
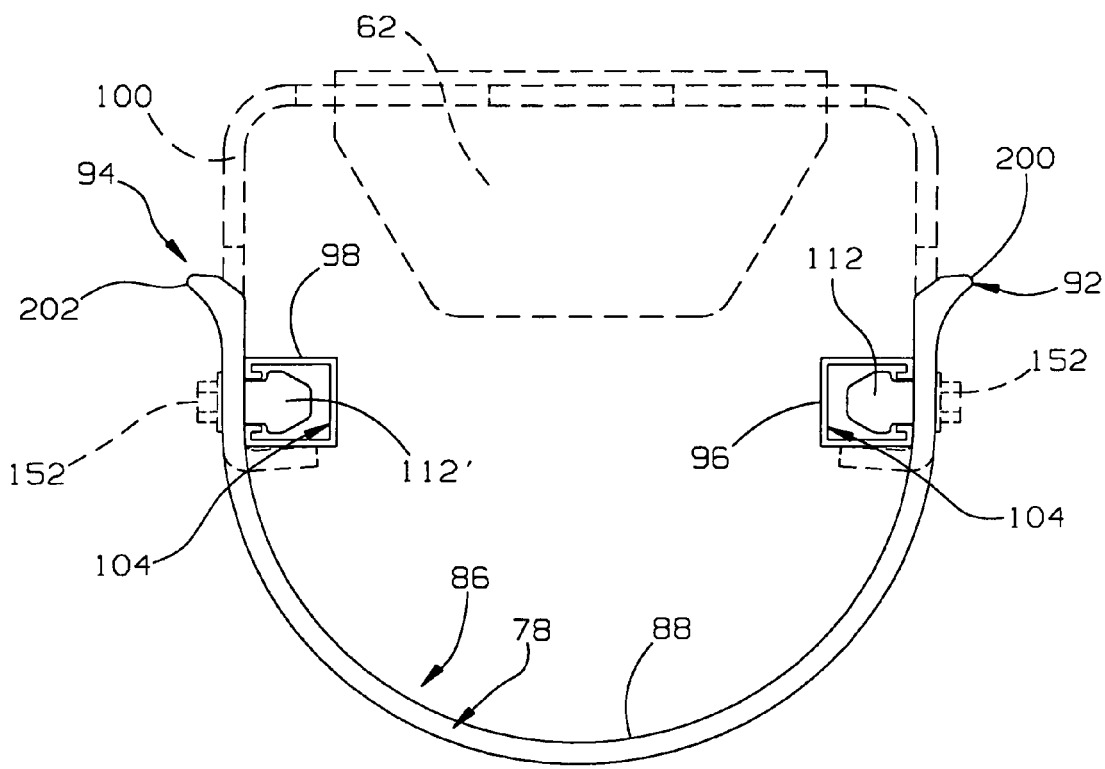
FIG. 14 is an enlarged, side elevation view of the roller safety support system, with one of the brackets of FIGS. 12 and 13 separated to allow the wall assembly to be selectively placed into, and separated from, the operative state on the frame assembly.

To install the roller safety support system 60, the wall assembly 78 and frame assembly 80 can be preassembled and connected as a unit or installed by assembling parts thereof on site. In either process, exemplary bracket 100 can be joined with the channels 96,98, and the associated fasteners 154 either fully tightened or snugged to maintain a preliminary relationship between the bracket 100 and channels 96,98. The connecting portions 92,94 on the sheet 88 can then be aligned with the slots 104,104', as shown in FIG. 15, whereupon the wall assembly 78 can be slid in the direction of the arrow 122 to fully seat the projections 112,112' in the slots 104,104', as seen in FIG. 14. Thereafter, the bracket 102 is installed and tightened using the fasteners 154 so that the sheet 88 is captive between the brackets 100,102 against movement along the line L. As previously noted, both brackets 100,102 can be shifted lengthwise along the channels 96,98 and fixed at a desired location. At the same time, with the fasteners 154 loosened, the desired depth of the receptacle 86 can be selected by adjusting the channels 96,98 vertically along the brackets 100,102.

Figure 19:
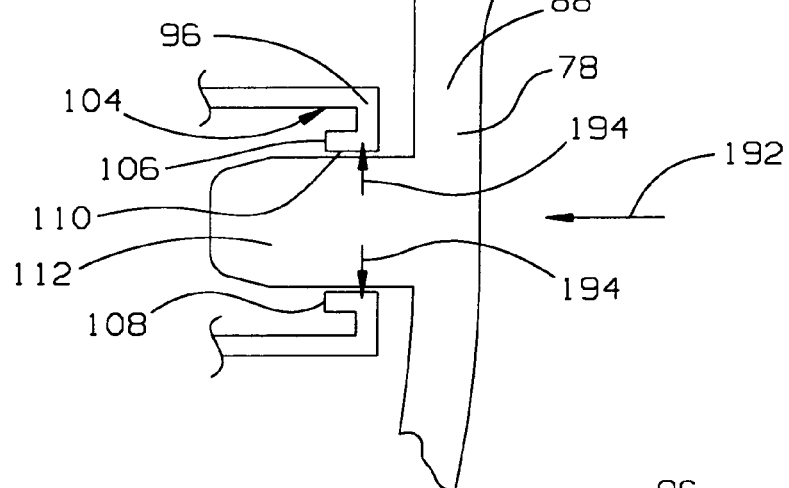
FIG. 19 is a view as in FIG. 18 wherein the projection is being forced from the FIG. 18 position through the entry opening.

Another, and more preferred, manner of placing the wall assembly 78 in its operative state is depicted in FIGS. 16-20. The frame assembly 80 can be preassembled, with all of the threaded fasteners 154 tightened with the bracket 100,102 appropriately situated relative to the channels 96,98 and secured to the base 82. The wall assembly 78 is situated relative to the preassembled frame assembly 80 so that the width W thereof resides between the brackets 100,102 with the length L1 (FIG. 6) of the projection 112 aligned with the length L2 (FIG. 11) of the channel 96 and the associated slot 104, and with the projection 112 immediately at the entry opening 110 through the channel 96, as shown particularly in FIG. 18. By then exerting a force in the direction of the arrow 192 in FIG. 18, generally parallel to the travel line for the conveying belt 20, the enlarged portion 114 of the projection 112 can be forced into and through the entry opening 110. The tapered arrangement, adjacent the free end 115 of the projection 112, guides the projection 112 into the entry opening 110. Further force application causes the projection 112 to be deformed so that it is squeezed into the entry opening 110, as shown in FIG. 19. This is permitted by deformation of the projection 112 and/or an enlargement of the opening 110 by slight deformation of the channel 96, as shown by the arrows 194 in FIG. 19, to entry states. With the sheet 88 made from a urethane, or other compressible material, a significant amount of deformation of the projection 112 is allowed to occur, as shown for the projection in FIG. 19.

Continued movement of the projection 112 in the direction of the arrow 192 causes the projection 112 to clear the channel ends 106,108, whereupon the projection 112 changes from the entry state of FIG. 19 toward, and preferably fully into, an undeformed state. In the undeformed state, the shoulders 124,126 abut to the channel ends 106, 108 to prevent withdrawal of the projection from the slot 104 under force application on the projection 112 in a direction opposite to the assembly direction, indicated by the arrow 192. Accordingly, the projection 112 can be snap fit/connected into, and maintained in, the slot 104 by a simple translational movement of the projection 112 relative to the channel 96.

Figure 16:
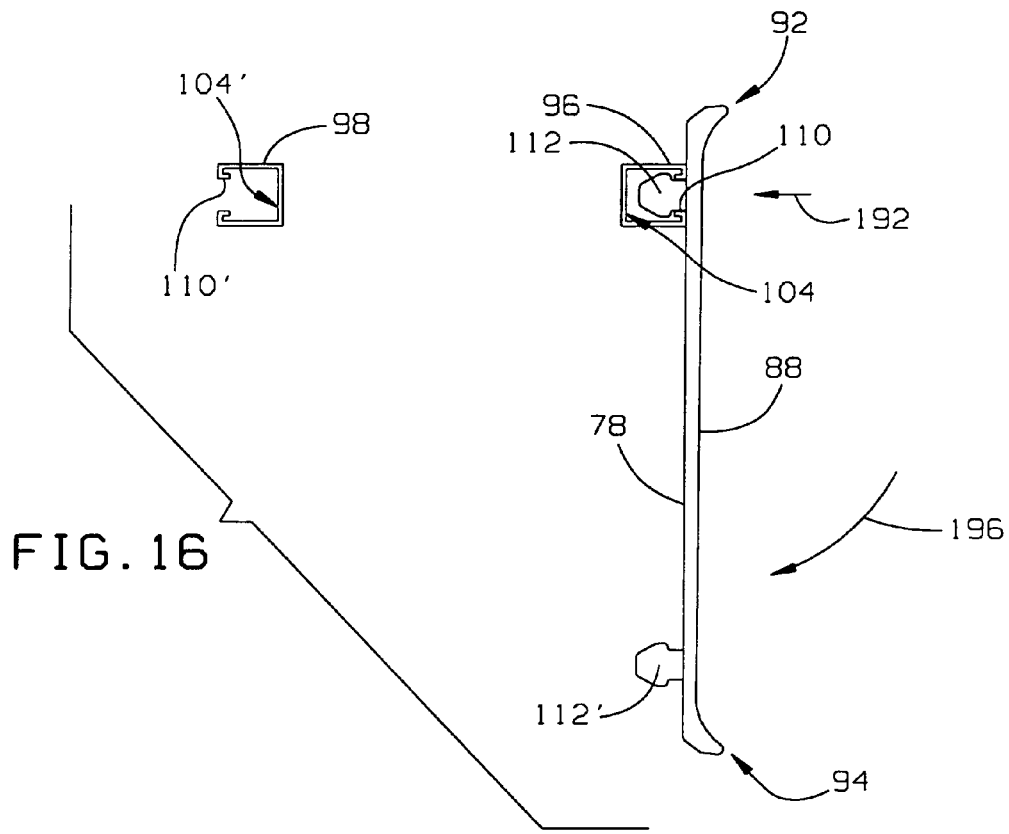
FIG. 16 is an enlarged, side elevation view of the two channels on the frame assembly with a first projection on the wall assembly in a first slot defined by one channel with the wall assembly in a preassembly position.
Figure 17:
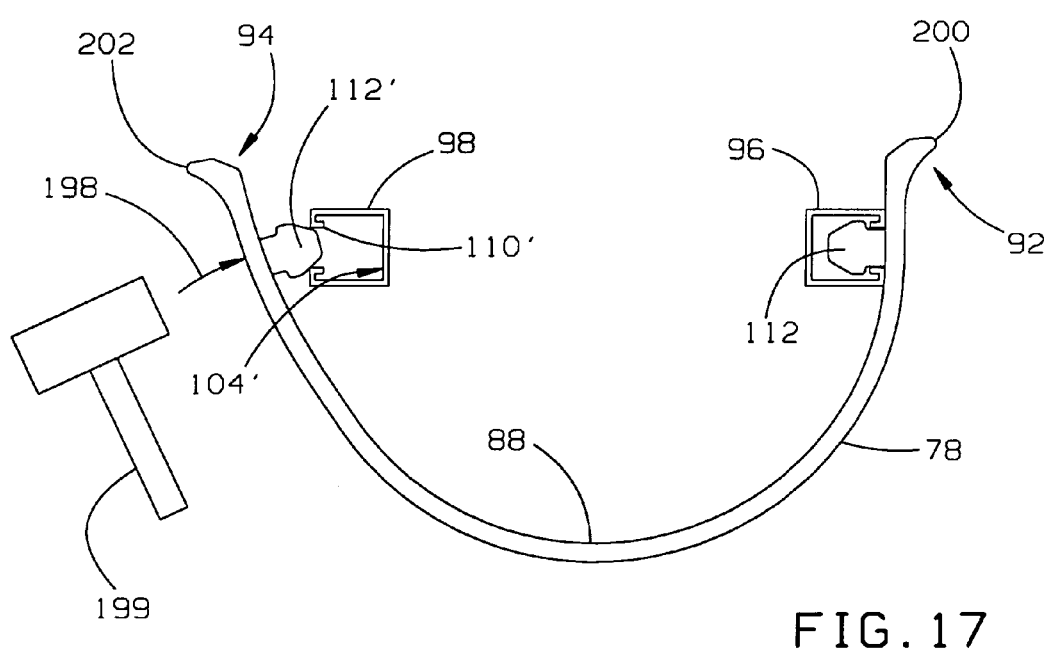
FIG. 17 is a view as in FIG. 16 wherein the wall assembly is reconfigured to present the second projection at an entry opening to a slot defined by the other channel.
Figure 18:
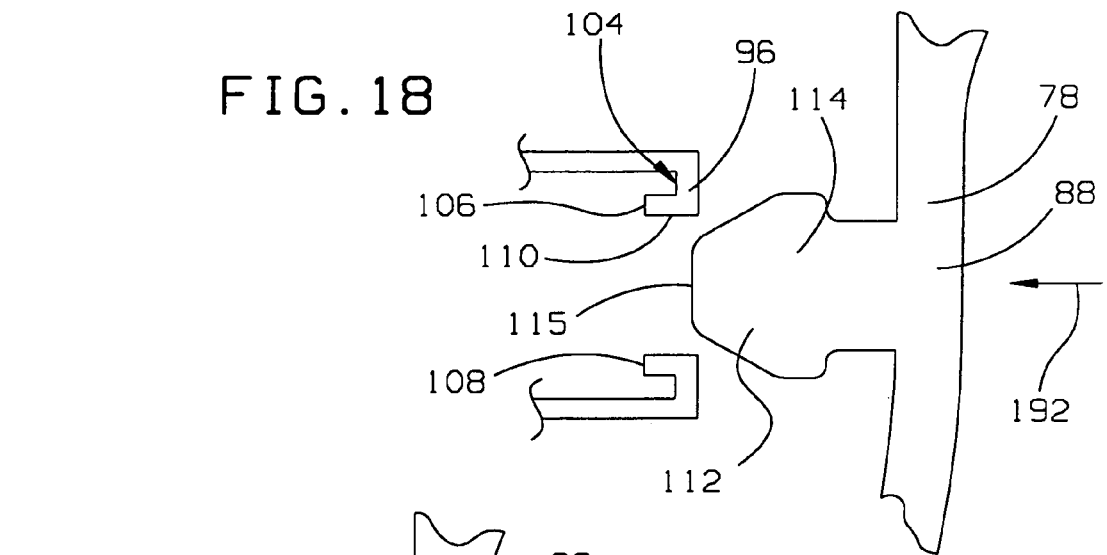
FIG. 18 is an enlarged, fragmentary, side elevation view showing the relationship between one of the first and second projections and one of the associated channels with the projection situated at an entry opening to a slot in the channel.

Once the projection 112 is seated, the sheet 88 is in the preassembly position of FIG. 16. The depending portion of the sheet 88, at which the connecting portion 94 is defined, can then be bent up, in the direction of the arrow 196, to present the projection 112' at the entry opening 110' on the channel 98. Through a force application in the direction of the arrow 198 in FIG. 17, the projection 112' can be seated in the slot 104' through the same process used to seat the projection 112 in the slot 104. As seen in FIG. 17, the force on the projection 112' can be imparted through a hammer 199. The hammer 199 can be used to likewise seat the other projection 112, as previously described. The sheet 88 sags consistently under its weight into an upwardly opening U shape.

Accordingly, assembly is facilitated by reason of allowing the sheet 88 to be put in place by performing three steps. In the first step, the projection 112 is forced into the slot 104. Thereafter, the sheet 88 is moved from the preassembly position in FIG. 16 into the position shown in FIG. 17. Finally, the projection 112' is seated in the slot 104'.

As an alternative to fixing the channels 94, 96 by tightening the fasteners 152, the channels 94, 96 can be loosely installed and allowed to fall under their weight to against the bracket walls 142, 144, preparatory to attaching the sheet 88. Once the sheet 88 is secured to the channels 94, 96, the joined sheet 88 and channels 94, 96 can be elevated to produce the desired receptacle configuration, after which the fasteners 152 can be tightened to maintain the selected configuration.

Figure 20:
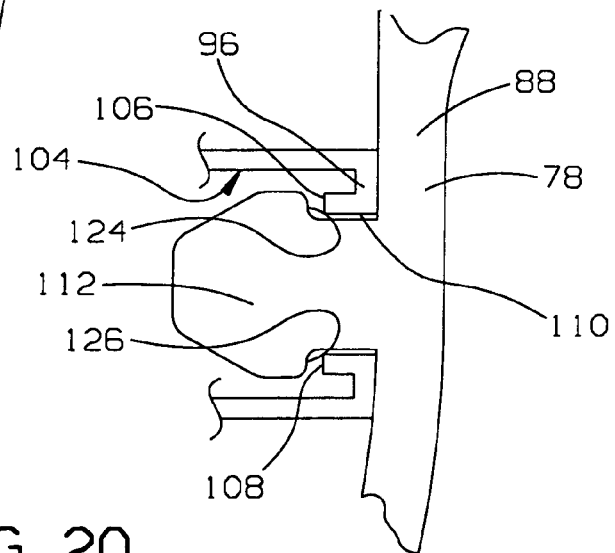
FIG. 20 is a view as in FIG. 19 wherein the projection has been extended fully through the entry opening into the slot.

If it is desired to remove the wall assembly 78, the frame assembly 80 can be disassembled, as previously described, to allow sliding of the sheet 88 out of its operative state by movement in a direction opposite to arrow 122 in FIG. 15. Alternatively, the projections 112,112' can be wedged out of their respective slots 104,104' by reversing the assembly steps. The sheet 88 can be made from a material that is sufficiently deformable to make this possible. The construction shown is such that the projections 112,112', once snap fit into their respective slots 104,104', will prevent inadvertent separation of the wall assembly 78 from the frame assembly 80. That is, as seen in FIG. 20, the projection 112 will have sufficient integrity that the interference between the shoulders 124,126 and the channel ends 106,108 will prohibit withdrawal of the projection 112 from the slot 104 under all anticipated operating forces, including under forces imparted in the event that the support/idler roller associated therewith disengages from its operative position. However, it is possible that a sufficient wedging force, greater than any force anticipated during operation, can be applied to cause the projection 112 and/or channel 96 to deform to allow the projection 112 to pass outwardly through the entry opening 110 to allow a change in the wall assembly 78.

While the projections 112,112' have been shown to extend the full lengthwise dimension of the sheet 88, the invention contemplates that cooperating projections and receptacles may be configured to produce a more localized connection. For example, a projection may be defined in the form of a discrete post which snaps into a complementary slot of approximately the same or greater dimension.

Another aspect of the invention is the optional provision of cleaning edges 200,202 from extensions of the connecting portions 92,94, respectively. The exemplary cleaning edge 200 is radiused and defined at the juncture of converging surfaces 204,206 (FIG. 10). The cleaning edge 202 is a mirror image of the cleaning edge 200. During operation, the cleaning edge 202 resides upstream of the cleaning edge 200 and is primarily responsible for scraping foreign material from the downwardly facing belt surface 50 before the foreign material can migrate into the receptacle 86, as might cause a detrimental accumulation therewithin. The cleaning edge 200 performs a redundant cleaning action after the conveying belt 20 travels downstream beyond the roller safety support system 60.

While the invention has been described with particular reference to the drawings, it should be understood that various modifications could be made without departing from the spirit and scope of the present invention.

The invention claimed is:

1. A conveyor system comprising:
   a conveying belt trained around a plurality of guide rollers for movement in an endless travel path to convey articles and materials in a travel line;
   a first roller mounted in an operative position on a support to bear against the conveying belt; and
   a roller safety support system comprising a wall assembly that confines downward movement of the first roller in the event that the first roller becomes disengaged from the operative position,
   the roller safety support system further comprising a frame assembly,
   the wall assembly mounted to the frame assembly so that an upwardly facing surface on the wall assembly bears supportingly against the first roller in the event that the first roller becomes disengaged from the operative position,
   the upwardly facing surface bounding a receptacle in which the first roller is confined by the wall assembly in the event the first roller disengages from the operative position,
   the receptacle having a variable configuration,
   the wall assembly comprising at least one sheet connected to the frame assembly at spaced first and second locations to be in an operative state wherein the at least one sheet extends continuously between the first and second locations around the first roller without engaging the first roller,
   wherein the at least one sheet comprises a non-metal material and has a plurality of openings therethrough bounded by a network of interconnecting elements that cause the sheet to be weakened so that the sheet can be readily reconfigured,
   the plurality of openings allowing passage of discrete foreign material separated from the conveying system.

2. The conveyor system according to claim 1 wherein the wall assembly comprises a urethane material that is flexible to be readily reconfigured into different shapes without being fixed in any shape into which the material is reconfigured.

3. The conveyor system according to claim 1 wherein the frame assembly comprises a first bracket, the conveyor system further comprises a base to which the first bracket is mounted to maintain the roller safety support system in operative relationship with the first roller, the frame assembly comprises a first support element for the wall assembly, and the receptacle is variable in configuration by vertically repositioning the first support element relative to the first bracket.

4. The conveyor system according to claim 1 wherein the wall assembly comprises a sheet with a fixed curved configuration bounding the receptacle.

5. A conveyor system comprising:
a conveying belt trained around a plurality of guide rollers for movement in an endless travel path to convey articles and materials in a travel line;
 a first roller mounted in an operative position on a support to bear against the conveying belt; and
 a roller safety support system comprising a wall assembly that confines downward movement of the first roller in the event that the first roller becomes disengaged from the operative position,
 the roller safety support system further comprising a frame assembly,
 the wall assembly mounted to the frame assembly so that an upwardly facing surface on the wall assembly bears supportingly against the first roller in the event that the first roller becomes disengaged from the operative position,
 the upwardly facing surface bounding a receptacle in which the first roller is confined by the wall assembly in the event the first roller disengages from the operative position,
 the receptacle having a variable configuration,
 wherein the wall assembly comprises a sheet that is connected to the frame assembly at spaced first and second locations between which the receptacle is defined by the sheet,
 wherein the sheet defines a first edge for bearing against and cleaning the conveying belt as the conveying belt moves in the endless travel path.

6. The conveyor system according to claim 5 wherein the sheet defines a second edge for bearing against and cleaning the conveying belt as the conveying belt moves in the endless travel path.

7. A conveyor system comprising:
a conveying belt trained around a plurality of guide rollers for movement in an endless travel path to convey articles and materials in a travel line;
 a first roller mounted in an operative position on a support to bear against the conveying belt; and
 a roller safety support system comprising a wall assembly that confines downward movement of the first roller in the event that the first roller becomes disengaged from the operative position,
 the roller safety support system further comprising a frame assembly,
 the wall assembly mounted to the frame assembly so that an upwardly facing surface on the wall assembly bears supportingly against the first roller in the event that the first roller becomes disengaged from the operative position,
 the upwardly facing surface bounding a receptacle in which the first roller is confined by the wall assembly in the event the first roller disengages from the operative position,
 the receptacle having a variable configuration,
 wherein the wall assembly comprises at least one sheet that is connected to the frame assembly at spaced first and second locations to be in an operative state wherein the at least one sheet defines the receptacle,
 wherein there is a first support element at the first location and there are a cooperating first receptacle and first projection, one each on the first support element and sheet, the first projection residing in the first receptacle with the sheet in the operative state,
 wherein the first receptacle comprises a first elongate slot and the first projection is directed into the first elongate slot one of: a) in a first direction in a first line transversely to the travel line to place the sheet in the operative state, and b) by movement in a second direction in a second line that is generally parallel to the travel line.

8. The conveyor system according to claim 7 wherein the first projection is snap fit into and maintained in the first receptacle.

9. The conveyor system according to claim 8 wherein the sheet comprises a first neck on which the first projection is located, the first receptacle is defined by a first channel with a first wall having a first entry opening and the first neck, first projection, and first entry opening are relatively dimensioned and constructed so that at least one of the channel and first projection is deformable and is deformed to an entry state as the first projection is pressed through the first entry opening into the first receptacle by movement of the projection in an assembly direction, whereupon the at least one of the channel and first projection that is deformed to an entry state is changed back towards an undeformed state wherein the first projection is blocked from being removed from the first receptacle by movement of the projection oppositely to the assembly direction.

10. The conveyor system according to claim 7 wherein the first elongate slot has a length extending transversely to the travel line and the first projection is elongate with a length extending generally parallel to the length of the first elongate slot.

11. The conveyor system according to claim 7 wherein the first elongate slot is defined by a first channel with a first wall having a first entry opening, the sheet comprises a first neck on which the first projection is located, the first neck, first projection, and first entry opening relatively dimensioned so that a) the first neck can pass through the first entry opening as the first projection moves into the first slot by movement of the sheet relative to the frame assembly along the first line and b) the first projection is blocked from passing through the first entry opening by movement of the sheet transversely to the first line relative to the frame assembly without deforming at least one of the first wall and first projection to place the sheet in and remove the sheet from the operative state.

12. A conveyor system comprising:
a conveying belt trained around a plurality of guide rollers for movement in an endless travel path to convey articles and materials in a travel line;
 a first roller mounted in an operative position on a support to bear against the conveying belt; and
 a roller safety support system comprising a wall assembly that confines downward movement of the first roller in the event that the first roller becomes disengaged from the operative position,
 the roller safety support system further comprising a frame assembly, the wall assembly mounted to the frame assembly so that an upwardly facing surface on the wall assembly bears supportingly against the first roller in the event that the first roller becomes disengaged from the operative position, the upwardly facing surface bounding a receptacle in which the first roller is confined by the wall assembly in the event the first roller disengages from the operative position, the receptacle having a variable configuration, wherein the wall assembly comprises a sheet that is connected to the frame assembly at spaced first and second locations to be in an operative state wherein the sheet sags under its own weight between the first and second locations at which the receptacle is defined.

13. The conveyor system according to claim 12 wherein there is a first support element at the first location and there are a cooperating first receptacle and first projection, one each on the first support element and sheet, the first projection residing in the first receptacle with the sheet in the operative state.

14. The conveyor system according to claim 13 wherein the first receptacle comprises a first elongate slot and the first projection is directed into the first elongate slot in a first direction in a first line transversely to the travel line to place the sheet in the operative state.

15. The conveyor system according to claim 14 wherein the first elongate slot is defined by a first channel with a first wall having a first entry opening, the sheet comprises a first neck on which the first projection is located, the first neck, first projection, and first entry opening relatively dimensioned so that a) the first neck can pass through the first entry opening as the first projection moves into the first slot by movement of the sheet relative to the frame assembly along the first line and b) the first projection is blocked from passing through the first entry opening by movement of the sheet transversely to the first line relative to the frame assembly without deforming at least one of the first wall and first projection to place the sheet in and remove the sheet from the operative state.

16. The conveyor system according to claim 15 wherein there is a second support element at the second location and the sheet has a second projection and a second neck which cooperate with the second support element in substantially the same manner as the first projection and first neck cooperate with the first support element.

17. The conveyor system according to claim 16 wherein the second support element has a second wall with a second entry opening corresponding to the first entry opening and the first and second walls face oppositely to each other.

18. The conveyor system according to claim 14 wherein the frame assembly comprises a first bracket that is attached to the first support to block movement of the first projection out of the first elongate slot by movement of the first projection oppositely to the first direction.

19. The conveyor system according to claim 18 wherein the first bracket is attachable to the first support element selectively at different positions along the first line.

20. The conveyor system according to claim 18 wherein the frame assembly comprises a second bracket that is attached to the first support element to block movement of the first projection out of the first slot by movement of the first projection in the first direction relative to the second support element.

21. The conveyor system according to claim 20 wherein the conveyor system further comprises a base and the first and second brackets are mounted to the base to maintain the roller safety support system in operative relationship with the first roller.

22. The conveyor system according to claim 18 wherein the first roller has a first rotational axis and the first bracket extends around the first axis so that an axial end of the first roller is unobstructed by the first bracket as viewed along the first rotational axis.

23. The conveyor system according to claim 18 wherein the first bracket and first support element can be fixed to each other selectively at a plurality of different relative vertical positions.

24. The conveyor system according to claim 23 wherein the first support element comprises a first channel, the first bracket has walls with facing surfaces and the first channel is confined in a vertical direction between the facing wall surfaces on the first bracket.

25. The conveyor system according to claim 24 wherein the first bracket has a C shape with first and second free ends projecting towards each other and one of the free ends defines one of the facing walls.

26. The conveyor system according to claim 13 wherein the first projection is directed into the first receptacle by movement in a first direction in a first line that is generally parallel to the travel line.

27. The conveyor system according to claim 13 wherein the first projection is snap fit into and maintained in the first receptacle.

28. The conveyor system according to claim 27 wherein the sheet comprises a first neck on which the first projection is located, the first receptacle is defined by a first channel with a first wall having a first entry opening and the first neck, first projection, and first entry opening are relatively dimensioned and constructed so that at least one of the channel and first projection is deformable and is deformed to an entry state as the first projection is pressed through the first entry opening into the first receptacle by movement of the projection in an assembly direction, whereupon the at least one of the channel and first projection that is deformed to an entry state is changed back towards an undeformed state wherein the first projection is blocked from being removed from the first receptacle by movement of the projection oppositely to the assembly direction.

29. The conveyor system according to claim 28 wherein the first receptacle comprises an elongate slot with a length extending transversely to the travel line and the first projection is elongate with a length extending generally parallel to the length of the elongate slot.

30. The conveyor system according to claim 27 wherein there is a second support element at the second location and there are a cooperating second projection and second receptacle, one each on the second support element and sheet.

31. The conveyor system according to claim 30 wherein the second projection is snap fit into and thereby maintained in the second receptacle.

32. The conveyor system according to claim 12 wherein the sheet has a plurality of openings therethrough bounded by a network of interconnecting elements that cause the sheet to be weakened so that the sheet can be readily reconfigured, the plurality of openings allowing passage of discrete foreign material separated from the conveying system.

33. The conveyor system according to claim 32 wherein the sheet comprises urethane.

* * * * *